United States Patent [19]
Gibbons et al.

[11] Patent Number: 6,100,881
[45] Date of Patent: *Aug. 8, 2000

[54] APPARATUS AND METHOD FOR CREATING INTERACTIVE MULTIMEDIA PRESENTATION USING A SHOOT LOST TO KEEP TRACK OF AUDIO OBJECTS OF A CHARACTER

[76] Inventors: Hugh Gibbons, 21 Jackson St., Concord, N.H. 03301; Shannon Synan, 8 Howe St., Belchertown, Mass. 01007

[*] Notice: This patent issued on a continued prosecution application filed under 37 CFR 1.53(d), and is subject to the twenty year patent term provisions of 35 U.S.C. 154(a)(2).

[21] Appl. No.: 08/955,549

[22] Filed: Oct. 22, 1997

[51] Int. Cl.⁷ .................................................. G06F 17/00
[52] U.S. Cl. ........................ 345/302; 345/473; 707/101; 707/102; 707/530
[58] Field of Search ..................................... 707/501–540, 707/101, 102, 530; 345/302–348, 473, 326, 327, 328, 333, 329, 332, 339–346

[56] References Cited

U.S. PATENT DOCUMENTS

| | | | |
|---|---|---|---|
| 5,515,490 | 5/1996 | Buchanan et al. | 345/302 |
| 5,708,845 | 1/1998 | Wistendahl et al. | 345/302 |
| 5,806,079 | 9/1998 | Rivette et al. | 707/512 |
| 5,818,435 | 10/1998 | Kozuka et al. | 345/302 |
| 5,870,768 | 2/1999 | Hekmatpour | 707/501 |
| 5,892,507 | 4/1999 | Moorby et al. | 345/328 |

OTHER PUBLICATIONS

Crowcroft et al., "Some multimedia traffic characterisation and measurement results" Abstract, Telecommunications, Fourth IEE Conference on, 1993.

Sparacino et al., "Media actors: characters in search of an author" Abstract, MultiMedia Computing and Systems, IEEE International Conference on, ppg. Jun. 1999.

IEEE, "Consumer Electronics" Abstract, Digest of Technincal Papers, 1992.

*Primary Examiner*—Hosain T. Alam
*Assistant Examiner*—David Jung
*Attorney, Agent, or Firm*—Michael J. Persson, Esq.; Lawson, Philpot & Persson, P.C.

[57] ABSTRACT

A multimedia authoring apparatus and method that allows a multimedia author to focus solely on the content of the presentation. In its most basic form, the apparatus of the present invention includes a processor, a monitor and data storage medium, such as a magnetic or optical disk, and a multimedia database stored in a data storage medium. The processor includes means for creating and linking frames, scenes and action items, for automatically recording the action items and in an outline as the author creates them, for informing the author when a link has not been created from a given action item to another frame and for displaying a discrete portion of the presentation before all frames, scenes and action items have been created. The preferred embodiment of the apparatus includes a number of additional features including a means for recording the audio, video, text, and graphics; a choice of six different types of action items; a user controlled graphical display of the outline; a means for sharing a background between a number of frames; a means for comparing one recorded audio object with a newly recorded audio object; a means for displaying a cursor on the computer screen corresponding to the playback of the audio object; a comprompter; an animation system; and means for tracking ownership information relating to the various ownable objects of the project. The method includes the steps of writing a script by creating a series of frames within the scene, writing dialog within the frames, providing a background for the frames, and creating action item to link each of the frames to another of said frames; recording audio clips corresponding to dialog in the frames; animating characters so that they are coordinated with audio clips; and providing ownership information relating to ownable data within the presentation.

14 Claims, 12 Drawing Sheets

APPARATUS AND METHOD FOR CREATING INTERACTIVE MULTIMEDIA PRESENTATION USING A SHOOT LOST TO KEEP TRACK OF AUDIO OBJECTS OF A CHARACTER

FIELD OF THE INVENTION

The present invention relates to the field of interactive multimedia authoring devices and, in particular, to an apparatus and method for creating interactive multimedia presentations.

BACKGROUND OF THE INVENTION

From its inception twenty-five years ago, one of the most eagerly awaited developments of the personal computer has been multimedia—computerized adventures portrayed in video, graphics, animation, sound, and text. For the past six years, most personal computers sold have been capable of running multimedia productions, but multimedia has been a disappointment both artistically and economically. This problem is generally attributed to the lack of a multimedia authoring system that unlocks the creative power of the author, artist, teacher, storyteller, playwrite, poet—the person who has a story to tell.

Currently, there are some 67 multimedia authoring systems on the market. They pursue a bewildering array of different solutions to the authoring problem, but they have one key feature in common and it is this feature that hamstrings the creative person: they require the author to design the project first, then create it. It is as if, prior to writing a letter on a word processor, you were required to stipulate the number of paragraphs it would have, the theme of each paragraph, the number of sentences in each and the number of words in each sentence. Only after you had done this would you be allowed to start writing.

The creative process is very different in multimedia creation than in computer programming. The weakness in multimedia authoring systems has stemmed from a failure to appreciate that difference. "Spaghetti code," where each element can connect to any other element in an ad hoc, accidental way, is the bane of good computer programming, to be rooted out and killed off by exhaustive design and rigid obedience to rules. By contrast, to the extent that it emulates life, spaghetti code is the heart of multimedia, for everything in life connects to everything else in a frequently accidental manner.

The primary reason that spaghetti code is the bane of good computer programming is the essential difficulty in keeping track of where each piece of the code fits and where each "go to" line goes. This difficulty is manageable in smaller projects, but increases exponentially as the project grows. Therefore, considerable time is spent rewriting and organizing code and software design rules are strictly followed in order to manage this complexity. Because multimedia development software has, until now, followed the conventions of computer programming, these same management problems have plagued professional multimedia developers and has made it extremely difficult for novices to produce good multimedia presentations. Multimedia developers have dealt with the management problem in a manner similar to computer programming, i.e. extensive rewriting and organizing and adherence to strict design rules. Novices, however, have been forced to limit the scope of their presentations to manageable sizes. Each of these solutions is contrary to the creative process as each limits the author's creativity, producing lifeless works.

A major deficit of current multimedia authoring systems is that they treat the media, i.e. the text, audio, video, graphics, etc., as the fundamental elements rather than the characters, scenes and dialog which make up the traditional elements of a story. Thus, the author is not only confronted with the task of writing a credible and entertaining story, but also must piece together all of the media elements which the authoring system sees as the story itself.

Another drawback of current multimedia authoring systems is the inability of the author to obtain meaningful feedback during the authoring process. Ideally, once a group of frames have been constructed, an author would like to see how the frames flow in order to make edits while the content is still fresh in her mind. Current systems require that all intervening frames and links be constructed before the project may be viewed, making it impossible for the author to obtain meaningful, real-time, feedback. Rather, the author is forced to complete intervening links, which may be edited or deleted depending upon the author's perception of the frames when they are finally viewed, and unacceptably delaying feedback.

Another drawback of current multimedia systems is the lack, or inadequacy, of a graphical outline feature. Current systems having an outline capability require that an outline be generated by the author prior to writing the actual text. As noted above, this itself is a problem. However, once the outline is complete current systems display the outline in a predetermined fashion which may, or may not, reflect the author's perception of the story. Therefore, for an author to reorganize the story, the author must completely rearrange the outline, cutting portions and rerouting links. This additional effort detracts from the author's story writing efforts and, in the end, may not produce a workable outline.

Another hindrance to the creation of vibrant multimedia presentations is the difficulty encountered by authors seeking to provide meaningful direction to performers. Directing actors in multimedia is extremely difficult as the branching nature of multimedia means that a given shot could be reached from a variety of different frames, making its context an extremely complex concept which is difficult or impossible to convey to the actors. In fact, it may be difficult even for the author to recall the context within which a statement is made. The result is statements that are voiced inappropriately or emotionless statements that sound wrong in any context, both of which destroy the sense of conversation.

Another drawback of current multimedia authoring systems is the requirement that a separate background graphic be generated or copied into each frame. Because the author is forced to think about the graphic when each frame is created, the flow of the story is broken in the author's mind whenever a new frame is generated. In addition, in current systems the author must recopy the background graphic into each frame if changes have been made to that graphic after its initial placement. This requires the author to go back and figure out which frames had included that background and to keep track of which frames have been changed to include the updated background.

Still another drawback of current multimedia authoring systems is the difficulty in producing credible speaking animation. Current systems require the use of a separate animation program to generate images, which are imported into the multimedia authoring system and matched to the audio track. This process is time consuming and requires a substantial degree of animating skill to produce credible results.

Finally, another drawback of current multimedia authoring systems is the difficulty in keeping track of the various intellectual property, i.e. copyrights and trademarks, used in the project. A multimedia project will contain hundreds, more likely thousands, of separately ownable chunks of property. Every block of text, character, audio recording, background, video clip, headset and animation set is a discretely ownable piece of property. Where the author has created every one of those elements herself or where the project will not be placed for sale, there may be little reason to keep track of who owns each piece of property in the project. However, where the project may be sold and where there are a number of creators of the various chunks of property in the project keeping track of their ownership is essential. The trouble is, of course, that tracking the ownership of dozens of things, let alone hundreds or thousands of them, is a tedious job, and one which is not addressed by current multimedia authoring systems.

The inventor knows of no multimedia authoring system that automatically keeps track of the structure and attributes of a multimedia presentation and allows a multimedia author to focus solely on the content of the presentation, that allows the author to obtain meaningful feedback at any point in the development process, that allows the author to easily arrange a meaningful graphical outline, that allows the author to provide meaningful direction to performers, which eliminates the need for an author to provide and update graphical backgrounds for each frame, which integrates animation in a manner which allows an inexperienced user to produce credible animated images, or which keeps track of the ownership of the various pieces of intellectual property used in a multimedia project.

SUMMARY OF THE INVENTION

The present invention is a multimedia authoring apparatus and method that allows a multimedia author to focus solely on the content of the presentation. The invention eliminates the design and programming stages in the creation of a multimedia project, cutting the cost of multimedia development and giving the author direct control over the project from the initial conception of the idea to its shipment as a completed product. The structure of the project and the media that implement it emerge from the story that the author creates. This invention is the multimedia equivalent of the word processor, providing non-technical authors, artists, teachers, screen writers, game builders and poets with an intuitive tool that fits their own creative process, allowing the author to ignore the tools and to focus upon the work to be done. The power of this apparatus is that it allows the author to script the story and, based upon that script, keeps track of what media must be provided by the author and, regardless of how much media has been provided, allows the author to see how the story will be presented to the end user.

In its most basic form, the apparatus of the present invention includes a processor, a monitor and data storage medium, such as a magnetic or optical disk, and a multimedia database stored in a data storage medium. The processor includes means for creating and linking frames, scenes and action items, for automatically recording the action items and in an outline as the author creates them, and for informing the author when a link has not been created from a given action item to another frame. In addition, the apparatus of the present invention also includes a means for displaying a discrete portion of the presentation before all frames, scenes and action items have been created.

The preferred embodiment of the apparatus of the present invention includes a number of additional features including the following: a means for recording the audio, video, text, and graphics; a choice of six different types of action items; a user controlled graphical display of the outline; a means for sharing a background between a number of frames such that a change in the background of one frame will change the backgrounds in all frames which share that background; a means for comparing the one recorded audio object with a newly recorded audio object; a means for displaying a cursor on the computer screen corresponding to the playback of the audio object; a comprompter which displays text on the computer screen as an aid to a performer during recording; an animation system which allows the user to create and edit a headset to simulate a person speaking or to have the computer automatically generate the headset; and means for tracking ownership information relating to the various ownable objects of the presentation and printing permission applications to be sent to the owners.

The method of the present invention includes the steps of writing a script by creating a series of frames within the scene, writing dialog within the frames, providing a background for the frames, and creating action item to link each of the frames to another of said frames; recording audio clips corresponding to dialog in the frames; animating characters so that they are coordinated with audio clips; and providing ownership information relating to ownable data within the presentation.

Therefore, it is an aspect of the invention to provide a multimedia authoring apparatus that automatically keeps track of the structure of a multimedia presentation and allows a multimedia author to focus solely on the content of the presentation.

It is another aspect of the invention to provide a multimedia authoring apparatus capable of creating presentations that allow a player to truly interact with the presentation.

It is another aspect of the invention to provide a multimedia authoring apparatus that allows the author to obtain meaningful feedback at any stage in the authoring process.

It is another aspect of the invention to provide a multimedia authoring apparatus that allows a user to graphically arrange an outline of the presentation in a manner which is meaningful to the user.

It is another aspect of the invention to provide a multimedia authoring apparatus that allows a user to automatically share a background between multiple frames and to update the background in all frames when changes are made in one frame.

It is another aspect of the invention to provide a multimedia authoring apparatus that allows an author to provide meaningful direction to a performer.

It is another aspect of the invention to provide a multimedia authoring apparatus that integrates animation in such a manner as to make it easy for a novice user to produce credible animation.

It is another aspect of the invention to provide a multimedia authoring apparatus that automatically keeps track of all of the intellectual property used in a multimedia project.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Figure 1:
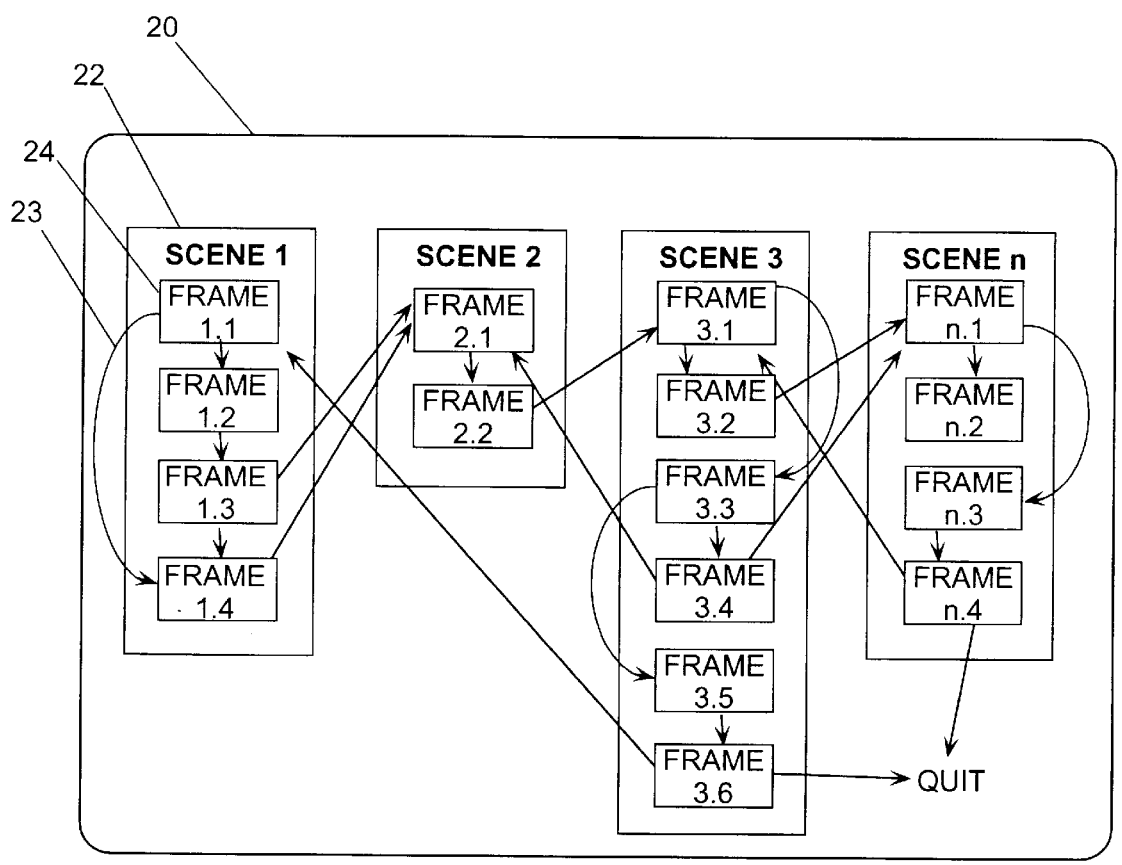
FIG. 1 is a flow chart of the general structure of a project in accordance with the present invention.

The apparatus and method of the present invention generates multimedia projects. As shown in FIG. 1, the structure 20 of a project is comprised of scenes 22, which are themselves comprised of frames 24, and action items 23 which link frames 24 and scenes 22. As in a movie, the scene is a structure that is solely a function of the author's imagination. A scene may represent, for example, an event, a location, a battle, a musical composition, whatever it is that the author thinks of as a unit of the story. The frame 24, by contrast, is the unit that is presented to the player. Each frame 24 will stay on screen until an event triggers the presentation of another frame. The event might be under the control of the author, as when one frame automatically leads to another, or it might be under the control of the player, as when the player chooses one from two or more buttons. The scenes 22 and frames 24 are the elements of the project, its "statics." The movement of the project between the elements, the project's "dynamics," is provided by the action items 23, or links, in each frame. The action items 23 generate the flow of the project, each one linking to another frame 24 as the project presents itself to the player and the player acts upon it. Together, the scenes 22, frames 24 and action items 23 constitute the structure 20 of the project.

In the present invention, the project structure need not be designed by the author, but rather it is an important aspect of the invention that the structure will be created by the apparatus as it tracks the flow of the story that the author generates. Though FIG. 1 presents a finite number of scenes and frames, a modestly sophisticated project could easily have dozens of scenes, hundreds of frames and thousands of action items. The present invention keeps track of that complexity automatically. One way in which this invention relieves the author of the need to be concerned about the structure of the project is the ability of the apparatus to assign each scene and frame a unique name automatically. Scenes are given whole numbers in accordance with their historical order of creation. Frames are named with the number of the scene they are part of, followed by a dot, then the next unused whole number in their order of creation. The author may add any identifier she wants to these identifiers, but they are retained throughout and are used by the apparatus to identify the frame and all of the elements that are part of it. In this manner, the apparatus removes the bookkeeping function from the author, allowing her to focus upon the story that is to be told. Everything in the project is labeled, stored and retrieved by the apparatus.

Figure 2:
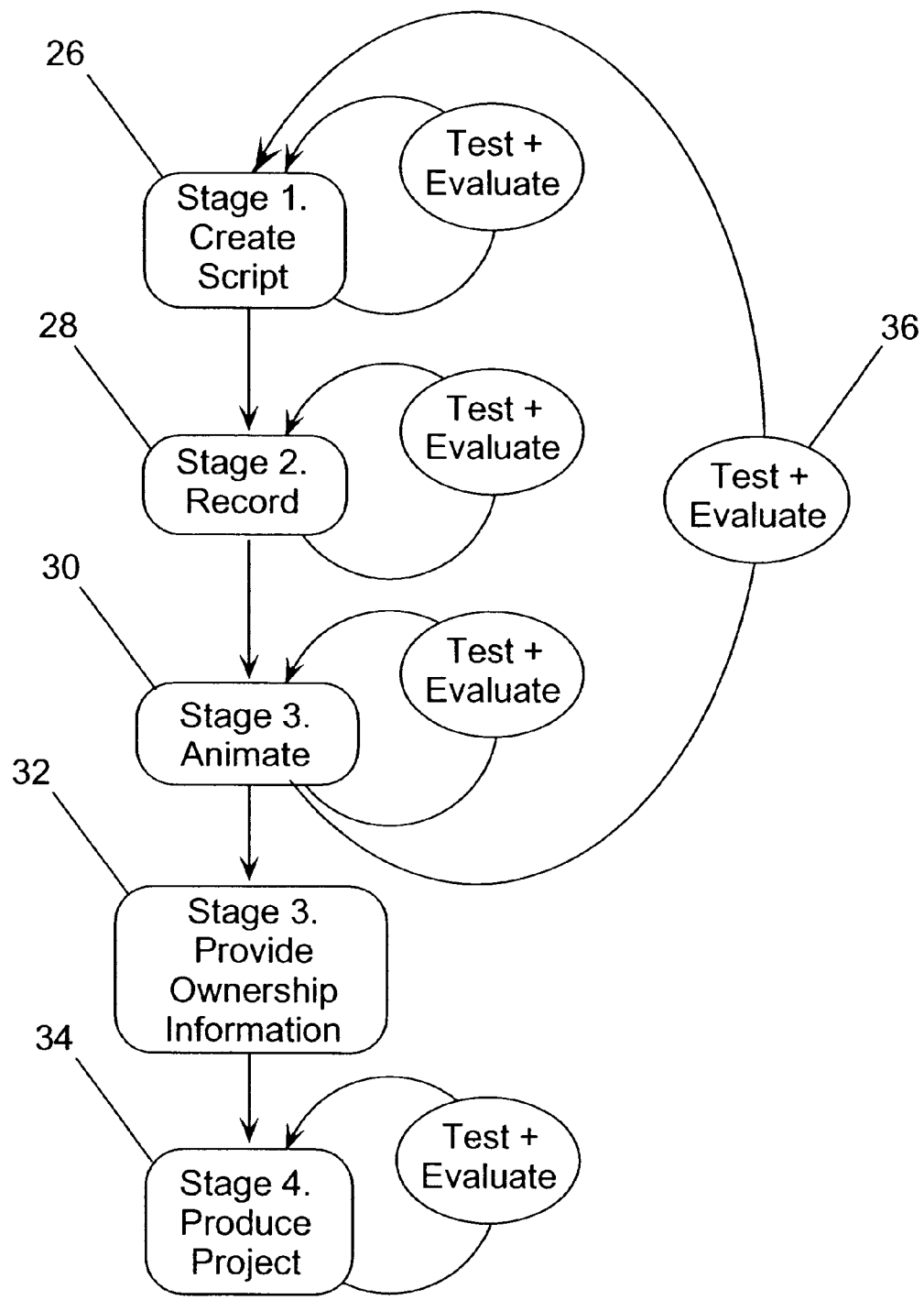
FIG. 2 is a flow chart of the method of creating a project in accordance with the present invention.

Referring now to FIG. 2, an overview of the project creation process is presented. The process consists of five stages; creating a script 26, recording sounds 28, animating 30, providing ownership information 32 and production 34. In the present invention, each stage in the process of creating a multimedia project is implemented as a mode of operation of the apparatus. As the author moves from stage to stage in the process, she moves from mode to mode in the apparatus. Each mode presents the author with a set of tools that is appropriate to that stage in the development of the project. While the author has considerable flexibility in the order in which these stages are completed, and consequently the order in which each mode is utilized, in the preferred embodiment of this invention the stages are completed in the order shown.

It is an important aspect of the invention that at every stage in the process the author may receive immediate feedback on the project as a whole or on any part of it by running it in exactly the way that it would run if it were complete at that point. There is no delay in the feedback, no gap, waiting while some other stage in the process is completed. This means that the author can proceed by "sketching," by experimenting with ideas, arranging and rearranging them, checking instantly to see whether the result fits what she intended.

Figure 3:
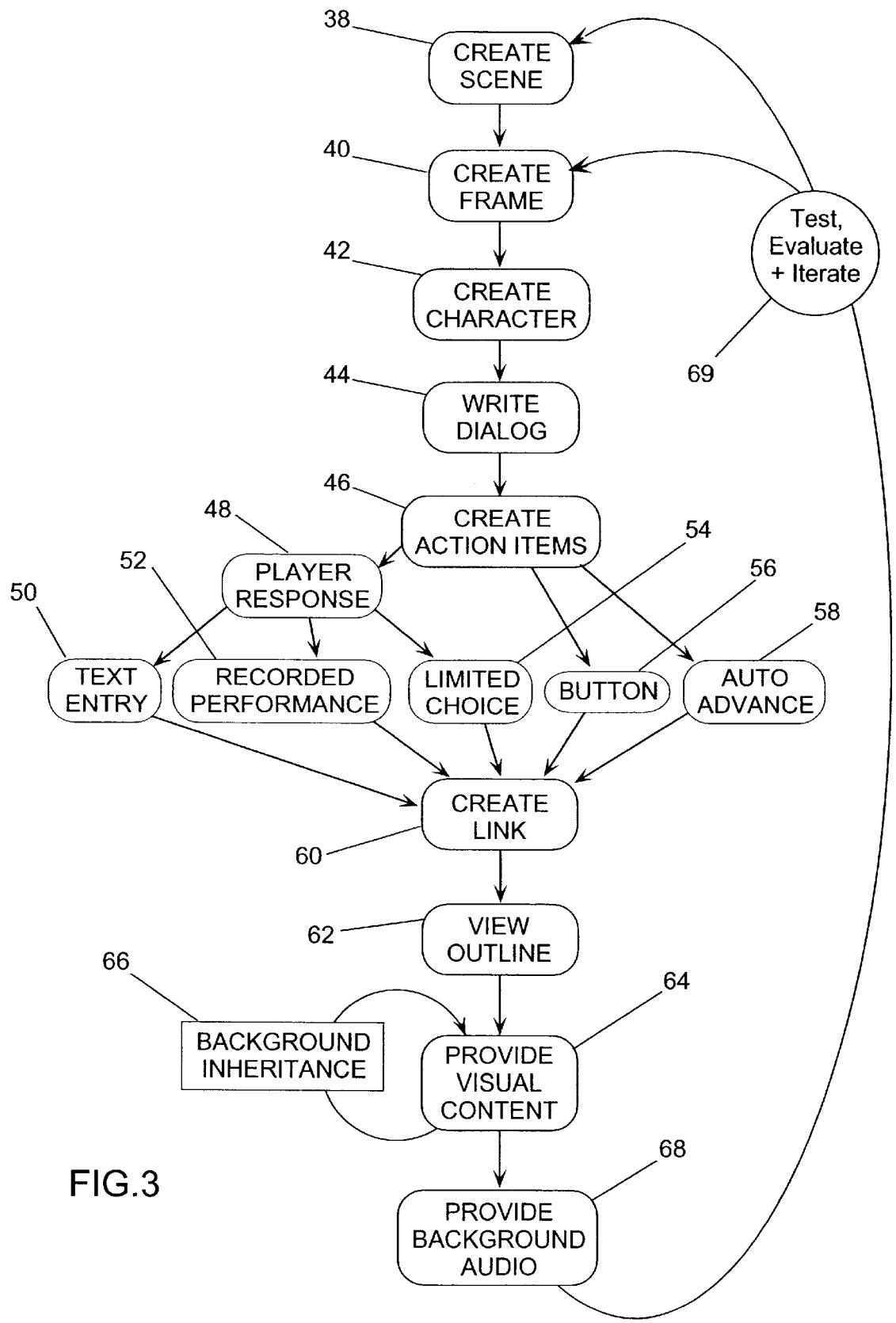
FIG. 3 is a flow chart of the method of creating a script in accordance with the present invention.

Referring now to FIG. 3, the script writing mode of the present invention is described. Creating a project begins with creating the first scene 38 in the project and creating the first frame 40 in that scene. Those steps will be repeated many times in the creation of the project as the author builds the complete experience for the player, scene by scene, frame by frame.

The most lifelike of multimedia projects, and therefore the most complex, is a "conversation," one that simulates a conversation between the player and one or more characters represented by the computer. While this apparatus will produce all types of multimedia projects and is not limited to conversational projects, the conversation is the most demanding type of project to implement and, therefore, is the type of project that will be used as an example throughout this patent application.

In a conversational project the next step after creating the scene 38 and frame 40 is defining the character 42 who will initiate the conversation with the player. The character may be one that the author will represent visually on screen or one who will simply appear in the project as a speaking voice from off screen. In either case, the author creates the dialog 44 to be spoken by the character by entering the text of the statement. The apparatus marks the text as a statement made by the named character, so that in Stage 2, when the author desires to record the statement as spoken dialog, the apparatus presents each statement made by the character for recording.

Figure 4:
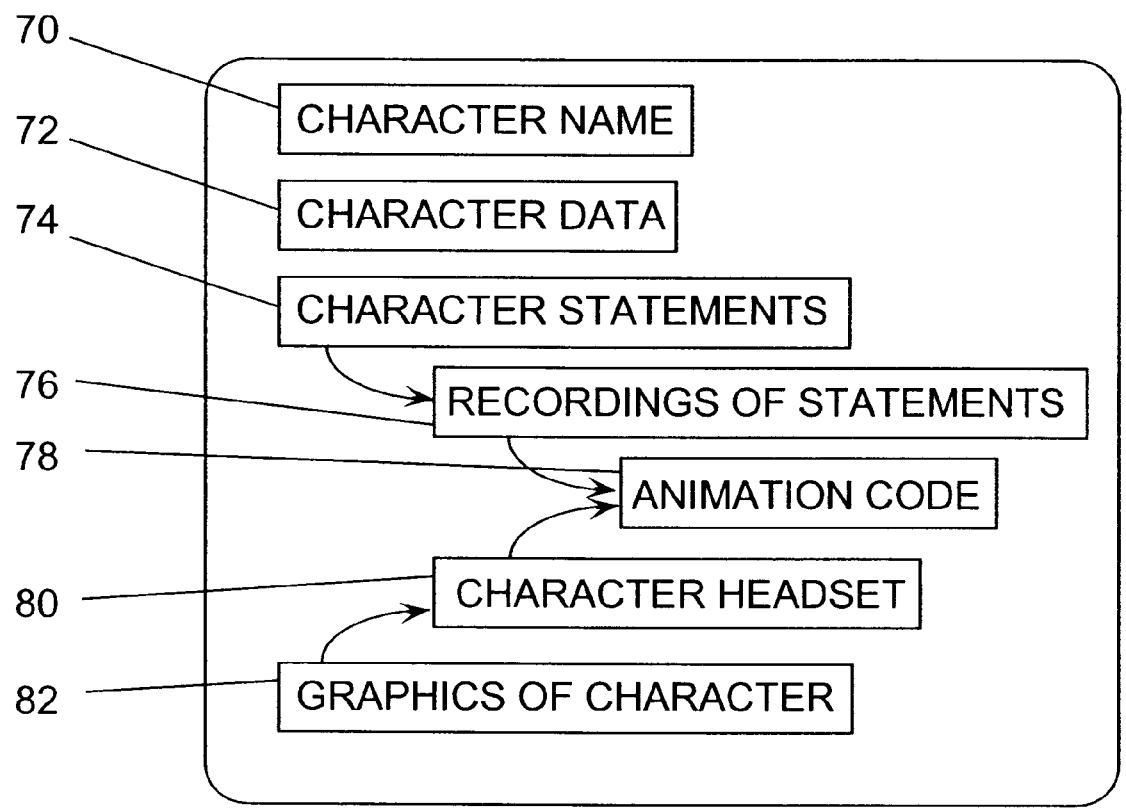
FIG. 4 is a flow chart of the structure of a character object in accordance with the present invention.

As can be seen in FIG. 4, the present invention treats the character as an entity, grouping everything in the project that is related to that character into a single entity represented by the character's name 70. As the character grows in the author's imagination, the author can make notes about the character, thereby relieving the author of the need to remember the particular facts and qualities that she has endowed the character with as the project has emerged. In addition, the apparatus will automatically keep track of every facet of the project relating to that specific character, including all character statements, graphics, video and headset files (discussed later) relating to the character. Treating the character as an entity within the project, with a name, a history, statements, and so on, is both novel and important to the story-first creation process. It is important because that is the way that authors think of characters—as unified beings who have an identity, a history, and behavior. The characters emerge as the author builds the story. Thus, the apparatus of the present invention builds characters as distinct units as the author creates more content for them. In addition, the unity of a specific character allows the apparatus to keep track of what statements, graphics, headsets or video and provide the author with a "shoot list" of all of these elements which need to be recorded by a specific character. In this manner, an author may direct an actor depicting a character through all necessary recordings in an orderly manner and be sure that nothing has been missed.

With a character on the frame with text entered that will later be recorded, the author must now make the frame dynamic by creating one or more action items 46. Action items may take three basic forms; automatic advance 58, button 56, and player response 48.

The simplest action element is the automatic advance 58, which presents a new frame on screen after the current frame has been on screen for a time interval determined by the author. If the author, for example, created an auto advance on frame 1.1 of a project with a delay of two seconds and a link to frame 1.2, frame 1.1 would open at the beginning of the project and any video or audio on the frame would play, followed on screen by frame 1.2 two seconds after the video or audio on frame 1.1 ended.

The auto advance keeps the flow of the project under the control of the author, exactly as it is in a movie. This can be useful, but the essence of multimedia is interaction, the flow of give and take between player and computer. To make interaction happen the author may give the player some control over the flow of the project by presenting one or more player-activated action items. Visible and invisible buttons 56 give the player a choice between actions that he would like to take. If, for example, the onscreen character in frame 1.1 asked, "Which anti-cholesterol medication has been prescribed for you?" and presented buttons labeled "Mevacor,""Provachol," and the other anti-cholesterol drugs, the player could choose which of them to pursue by clicking a button.

Buttons add a useful dynamic to the project, but they hardly implement a conversational give and take in the project. This invention provides a novel structure to implement a conversation, the "player response" 48. The player response is a mechanism that the author provides the player that implements the player's reply to the question or statement made by a character. This apparatus provides the author with three types of player responses that she may use in implementing the conversation. The first type of player response is the limited choice 54. Here, the author provides one or more responses which may be chosen by the player, each one of which constitutes an action item that will link to a different frame. Each of these responses would lead to a different statement by the character in the next frame and the conversation would continue along a path chosen by the player. At runtime the apparatus would then present the text of the player response on screen. The author may present only the text form of the statement, in which case when the player clicks on the text of the statement on screen the action item will be triggered and the linked frame presented. Or the author may record a voiced version of the statement (See FIG. 5). In that case, when the player clicks on the statement that he wants to make, the statement is voiced by the recording, acting as his voice in the project.

The second type of player response that the author can implement is an openended player response 52 in which the player's actual response to the character statement is recorded by the apparatus, as video or audio at the player's option. Instead of being presented with statements that have been provided by the author, here the player is presented with the statement or question made by a character, following which the apparatus waits for the player to record his response in audio or video. To see or hear his performance as part of the conversational project, the player reruns the project after recording his contributions and the apparatus interleaves each recorded player response into the project so that the player sees or hears his own actual response to the statement presented by the character in the computer. This method makes the player an intimate part of the production. He can see his performance in the context provided by the project itself. This is a very powerful way to engage the player in the project, and it provides a record of the player's performance in the simulated situation that might be of interest to an employer or customer. The author may leave the player free to make whatever response he wants to the character's question or statement or may provide the player with text on screen to guide the player's response.

In the third type of player response the character asks a question or makes a comment that requires a response in the form of text entry 50. The player enters his response, which is saved on the player's machine or communicated to a set destination via an email link. This mechanism allows the author to receive feedback from the player. In an instructional setting this would, for example, make possible remote testing.

The apparatus will allow the author to combine several of these action items on one frame. For example, the player may be presented with a limited choice set of player responses, plus a button that lets him Quit the project. Further, the author could place an auto advance on the frame that advanced it if the player failed to make a choice within a set number of seconds. The combination of different action items makes it possible to create an enormous variety of highly interactive projects.

Each action item must be linked. The author may link the item back to the same frame, on to another frame, on to a different scene, on to a different project, or to quit, in which case the run of the project will terminate at runtime if the linked action item is triggered. All of these links may be made contingent, linking to one destination if a set contingency has occurred and to a different destination if it has not occurred. The author may base the contingency upon the occurrence of a prior action item or upon the achievement of a set score level.

This is the point at which multimedia creation becomes complex. The complexity arises from two facts. First, the author can link only one action item at a time, but a frame may have two or more action items that need linking. While making one link it is very easy to forget the other links that need to be made. In fact, the tension created as one tries to do one thing without losing track of the others itself causes things to be missed and causes the mind of the author to be cluttered with confusion. The second source of complexity lies in the need to link to frames that are not yet in existence. There is a "chicken and egg" problem here: do you create all of the frames in the scene first, so that you will have something to link every action item to, or do you create one frame and its action items at a time, accepting the fact that any action item to be linked to a frame not yet created must hang out in the ether. The former approach requires the scene to be designed before the story has emerged, resulting in wooden, lifeless scenes. The latter approach requires the author to keep track of many loose ends at once.

This complexity creates a profound force in the author's mind for simplification, and there is a very simple rule that will produce simplification: put just one action item on each frame. One action item links to one frame, so things are kept manageable. Where there is only one action item on a frame, of course, there is no interaction between the project and the player beyond the mechanical process of having the player click the mouse in a foreordained location on screen. The project simply moves ahead in a rigid, mechanical way. Much of existing multimedia reflects this woodenness.

Until this invention, it was simply too difficult to produce projects that were richly branching. Producing a project that was a reasonable simulation of a conversation was out of the question-there is simply nothing as richly branching as a conversation, where, at every step in it, the people talking could reasonably say two, three, many different things. To implement a conversation the author must present each of the alternative statements that would be realistic at each step. This invention solves the branching problem by automatically recording the action items and their links in an outline of the project as the author creates them. The outline captures the implicit design of the project, leaving the author free to pursue the story in whatever direction it goes. It is an essential feature of story-first authoring.

Figure 5:
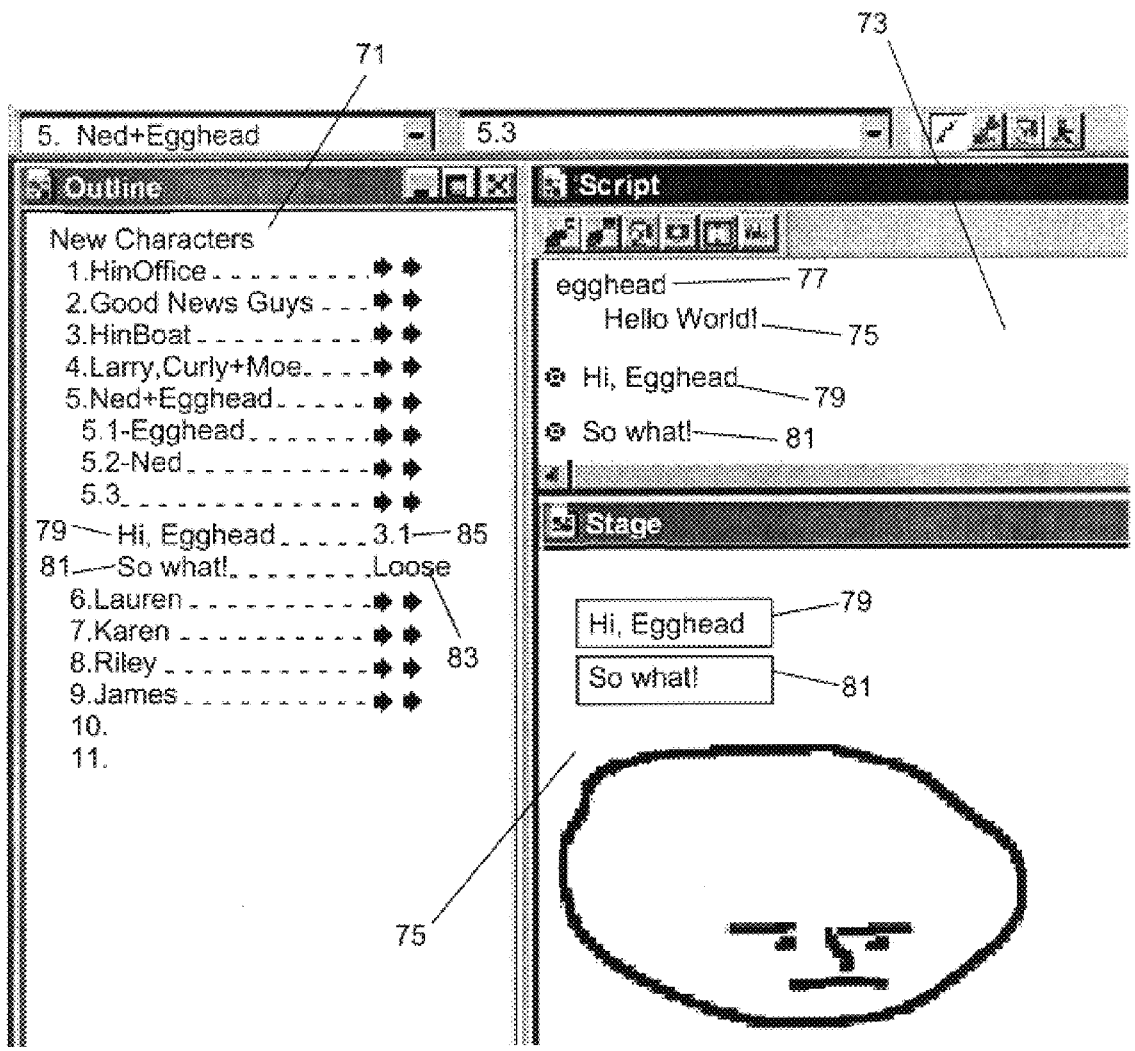
FIG. 5 is a representation of a computer screen viewed by an author in the script mode of the apparatus of the present invention.

Referring now to FIG. 5, a view of the arrangement of windows in the script mode is shown to demonstrate the interaction between the outline 71, script box 73 and stage 75. While in the script mode, the author enters dialog between the character and player in the scipt box 73. When a new character statement 75 is created, the name of the character 77 making the statement appears at the top of the script box 73 followed by the text of the statement 75. Character statements are typically followed by possible player responses 79, 81 which appear as text in the script box 73, as outline items in the outline 71 and as player response buttons in the stage 75. Each player response must be linked to another frame and the status of these links 83, 85 is displayed in the outline. In this case, link 83 has been created and will cause the response 79 "Hi, Egghead" to link to frame 3.1. It is also shown that link 85 is marked "Loose" meaning that the player response 81 "So what!" has not been linked to another frame. This loose ends feature lets the author create action items and move on with the story without linking them, secure in the knowledge that she can identify unlinked items and link them at her convenience. This provides the author with many different potential strategies for getting the work done and removes the burden of record keeping from her mind. It is an essential feature of storyfirst multimedia creation.

The contents of the outline are different in each stage of the project creation process. In all stages, the outline lists the scenes in the project and all of the frames within each scene. In Stage 1 of the process, the outline lists all of the action items in each frame under the name of the frame with which they are associated and shows unlinked frames as loose. However, in other stages, loose ends may be equated to animation that has not been completed, to sounds or video clips that have not been recorded or to ownership information that has not been provided. In this manner, the outline, in its various incarnations, keeps track of all relevant loose ends.

The present invention allows the author to view the outline as a list or as a graphic, with several variations on each method. Viewed as a list, the author can see the complete outline, which lists every scene and every frame with every action item. Alternatively, she can see it with a listing of only one kind of action item showingbuttons, player responses or auto advances. Most importantly, she may have it present only the loose ends, in which case the outline shows only those action items that are loose and only those scenes and frames that contain loose action items. In this way the author can easily spot what needs to be cleaned up and can get a sense of the amount of work to be done before the project is fully completed. Viewed as a graphic, the author can see the scenes, frames and action items as icons, with arrows representing the links between them. The author has a choice of four "altitudes" for viewing the graphic. She can view it from an overall perspective (the "Over View"), which shows all the scenes in the project, with the links between them. She can look within a scene to view all of the frames and the links between them (the "Scene View"). She can zoom in on a frame and see it along with all of the frames that point to it and the frames that it points to (the "Local View"). Or she can focus on a single frame and see all of its structures-action items, text blocks, character statements, and so on-as graphical elements within it (the "Interior View"). At every level of view, loose items are represented in a different color than elements that are linked.

The graphical view gives the author a visual sense of the structure of the project. It is a novel and important feature of the outline that the positioning of the icons on the screen is left to the author, not provided by the apparatus. When she first views the Over View, the icons representing any scenes that have been created are "stacked" in the center of the window, with the first that were created at the top of the stack. The author positions the icons by dragging them around the window and placing them in a relationship to each other that is meaningful to the author. The author does the same thing with the icons representing the frames in the scene in Scene View. At any time the author can rearrange the layout of the icons. The apparatus makes no effort to arrange the layout of the graphical view because the meaning of a graphical arrangement is highly idiosyncratic; different people derive highly different meanings from left to right, up to down, clockwise, counterclockwise, and so on. Arranging the display of the icons in the graphical views is where script-first authoring meets up with the structure of the project. The author who is confident of the story need never visit the graphic of the outline, but one who needs to visualize the project can use it to experiment with various arrangements of the story.

The next step in the process of creating the frame is providing the visual content 64 on the "stage". The stage is a structure that represents the screen that the player will see at runtime. The contents of the stage are the visual contents of the project. Already on stage will be any player responses 48 and buttons 56 that the author has created as action items and any textual information that the author has created in the script window. The author must provide the "background"; i.e. the photo, diagram, graphic, or painting that will be the backdrop for the other elements of the frame.

This apparatus provides several ways for the author to provide the background. If she has already created the background, she can simply import it or paste it into the stage window of a frame. Otherwise, the author can simply do a quick sketch of what she wants, perhaps with a note explaining it, and get on with building the story. She can return to the frame later or, if someone else will be providing the graphics for the project, she can give that person a copy of the project, which will provide full guidance to that person without the need for verbal direction.

In a project that moves by conversation between the computerized characters and the player, the number of frames can reach well into the hundreds because each step in the conversation requires a new frame. This would ordinarily require the creation of one background graphic for each frame, a burden so great as to render conversational multimedia all but impossible. This invention provides a method for avoiding that duplication, called "inheritance" 66. With inheritance 66, a frame is given the same background graphic as the frame that was current when the frame was created. That background, and any headsets associated with it, is shared by the frames so that any change to it changes it for all of the frames that share it, without any additional intervention required by the author. At any point the author may turn off the inheritance feature to limit a change to the frame that is being directly impacted.

In addition to the graphical background, action items and text, the stage may present a clip of video or animation, or animate some part of the background. The author imports the video or animation clip and places it on stage. To animate part of the background the author designates the region of the background to be animated by placing a frame around it. Actual animation is done in Stage 3 (See FIG. 7).

The final step in the creation of the script is to provide audio 68 to run in the background of the frame. The apparatus provides up to twelve layers of background audio, which means that the author can have twelve separate sound clips running at the same time in addition to the foreground audio. Statements spoken by a character or player are foreground audio and run on top of whatever audio is running in the background. The author may choose to run music, background noises or sound effects, or all of them playing together, with a player or character statement running in the foreground on top of them. This apparatus will integrate all of the background audio and start it playing at the opening of the frame, integrating any foreground audio as it is triggered in the course of the frame. Foreground audio is played at whatever point that it is reached in the play of the frame. Since its timing is up to the player, who triggers it by his actions, it must be played by the apparatus without effecting the play of the background sound.

Figure 6:
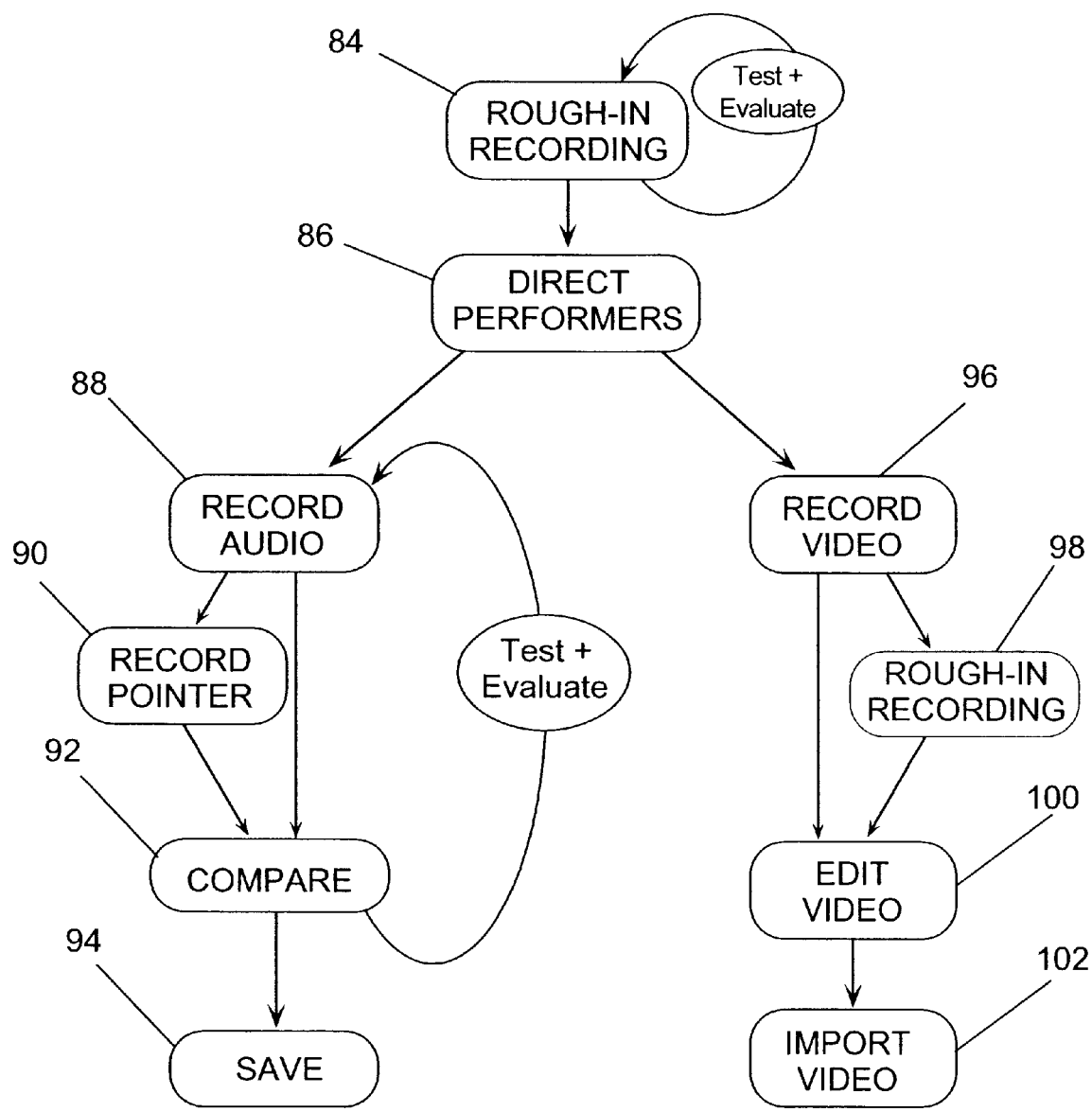
FIG. 6 is a flow chart of the method of recording spoken statements in accordance with the present invention.

Once the script has been created, the author will want to test and evaluate 69 the project. This is accomplished by simply running the project to view the results. The author may stop the run at any point, or pause the run to deposit a note to the current frame with any message that the author wants to leave. Once deposited, the note is listed on the outline as a loose end. This is an essential feature because it lets the author evaluate the project without losing the sense of its flow and, in a complex project, it lets the author explore the entire project without having to remember all of the changes that need to be made. Beyond this, the note feature makes for easy collaboration, providing an unambiguous basis for communication between author, artist, cinematographer, and testers. The script writing stage in this process, as described, must be iterated for each scene and for each frame within a scene Referring now to FIG. 6, a flowchart of stage two of the process is presented. As noted in connection with FIG. 2, the present invention allows the author to record portions of audio or video corresponding to the content of the frames. While it is not absolutely necessary, it is the preferred method for the author to record all of the speaking characters and the player parts early in the production process by rough-in recording 84 all of the roles herself. By recording all of the speaking parts, running the project will provide a good indication of what the finished product will look and sound like and enables the author to hear the dialog, which quickly reveals any strained, unrealistic dialog or nonsequiturs. It also enables the author to get initial feedback from others who are not involved in the production.

Most importantly, the rough recording of the speaking parts enables the author to direct the actors who will be recording the speaking parts. Directing actors in multimedia is extremely difficult as the branching nature of multimedia means that a given shot could be reached from a variety of different frames, making its context an extremely complex concept which is difficult or impossible to convey to the actors. In fact, it may be difficult even for the author to recall the context within which a statement is made. The result is statements that are voiced inappropriately or flat, emotionless statements that sound wrong in any context but are not complete clinkers. Both destroy the sense of conversation.

This apparatus solves that problem by means of the author's recording of the statements, using the audio recorder built into the apparatus. In the preferred method, the author records the spoken statements in the same session in which the script is written so that the context is fresh in mind and the statements can be given their most appropriate voicing. The recording will provide the essential direction and guidance of the actor who is to do the finished recording 86 of the statements. As the rough recordings are finished, the outline automatically changes to indicate that the statements have been recorded. Once the author is finished rough recording all of the statements, she will set the outline to show all statements as loose so that the outline may subsequently keep track of the progress of the finished recording.

Before he records the part, the actor runs the project, listening to the voicing of each statement in context. Most important, the actor can listen to each statement before recording it, then record 88 and compare his rendition 92 with the one made by the author, repeating the process 91 until his vocalization is a tolerable replication of the author's, at which point the audio clip is saved 94. Through this process, the author will have achieved intimate control over the actor's performance without any live interaction with the actor at all.

In addition to recording the audio, the present invention also includes a feature which allows the speaker to record a pointer 90 which tracks the movement of the onscreen cursor in coordination with a character's spoken statement. In this way, the speaker can point out the salient features of the graphic that is showing on screen. If, for example, the screen shows the diagram of a process, the narrator can describe the process verbally and use the pointer to direct the player through the graphic. This makes possible an intimate association between explanation, provided by the speaking character, and demonstration, provided by the moving cursor, two powerful educational techniques that multiply their force when used in conjunction with each other.

All statements made by the player and by characters who will not be represented on stage are recorded as audio. Statements made by onscreen characters may be represented by video or by animation. If they are to be animated, the statements are recorded as audio statements in the same way as the player and offscreen character statements are recorded. Characters who will be represented in video must be recorded outside of this apparatus 96 and the recorded video edited in an outside program 100. The preparation of the actor is, however, the same as in the case of audio recording. The author runs the project until he is familiar with his role. He may then record each statement in audio, using the compare function to master the correct voicing. During video recording the apparatus presents the actor's script via a comprompter function 98, in which each statement to be recorded is shown in large font so that the actor can use it to support his memory of the statement. Where the statement is too long to fit on screen at one time, it can be made to scroll at a pace set by the actor. At the same time, the actor's prior recording of the statement can be played to guide his voicing of the statement.

In the recording stage of production, the outline presents a listing of every statement in the project and its status as recorded or loose. The recording stage also gives the author a "shoot list," a list of every statement in the project organized by the character making the statement. The author can navigate through the statements to be recorded by using either the outline listing or the shoot list.

Figure 7:
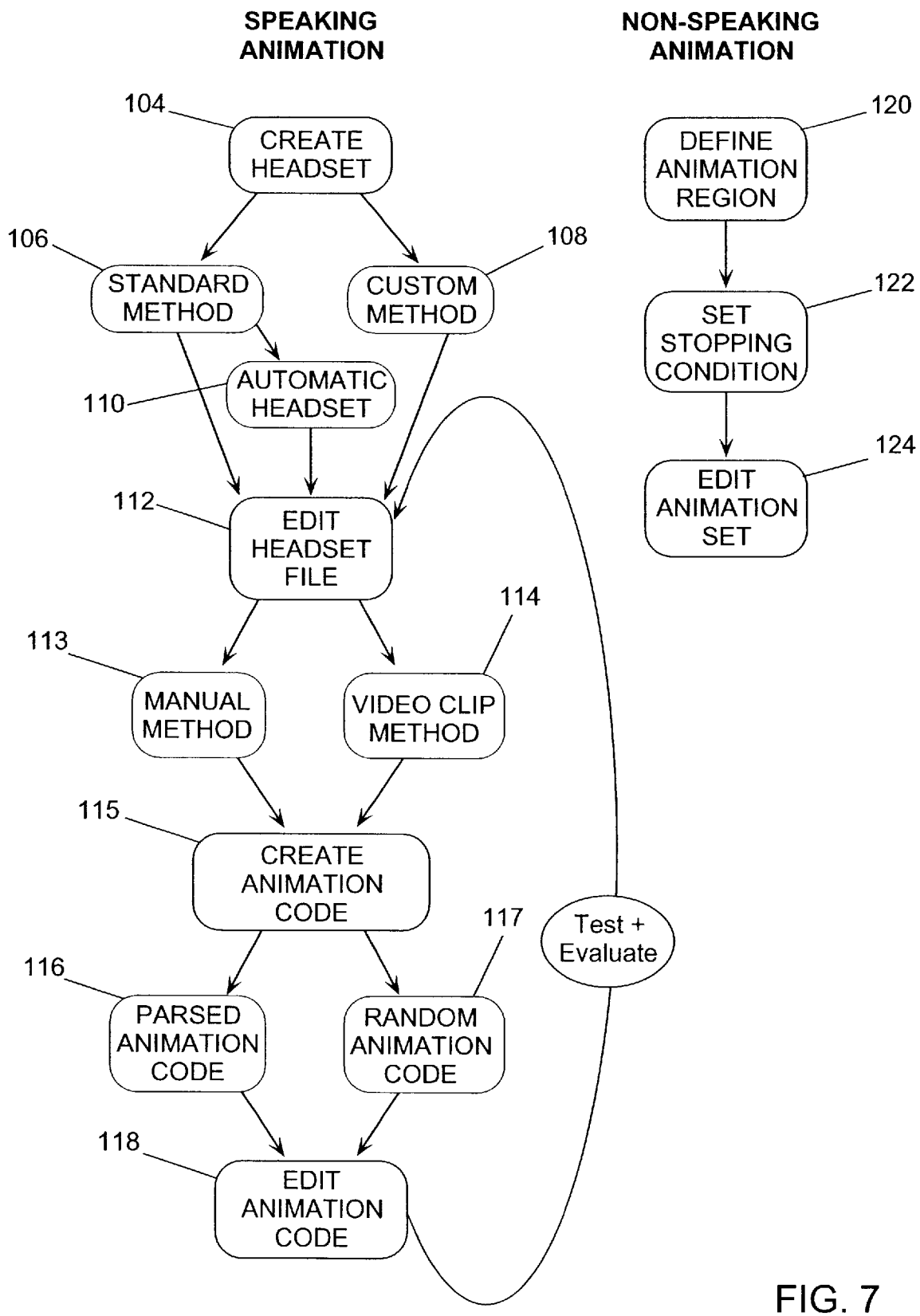
FIG. 7 is a flow chart of the method of animating a speaking character in accordance with the present invention.

Referring now to FIG. 7, a flowchart of the animation process is presented. The present invention provides two types of animation: speaking animation, in which graphical movements on screen are coordinated with the voicing of spoken statements in a way that conveys a sense that the character on screen is talking, and non-speaking animation, in which a graphic element on screen appears to move. Speaking animation is far more complex than non-speaking animation and will be taken up first.

The need for speaking animation arises when the author creates an onscreen character and writes a statement on a frame that she attributes to that character. If the statement is recorded, but no animation is provided, there is no error-the character simply does not appear on screen. In order to animate the statement, so that there is a graphic on screen representing the character speaking in coordination with the audio of the statement, the author must move to the animation stage of production by entering the animation mode of the apparatus. Animation is implemented in this apparatus by presenting a sequence of pictures on screen that differ slightly from each other and, when presented in rapid succession, create the illusion of movement. The pictures that make up the elements of the animation are included in a "headset" file, in the case of speaking animation, and in an "animation set," in the case of non-speaking animation. Every frame on which an onscreen character is speaking must have a background that has a headset associated with it (unless the onscreen character is presented by video, as described above). Were a different headset required for every frame on which a speaking character was animated, the amount of work required to create the headsets would make the task of creating speaking animation impracticable. In this invention, however, where the same character appears in the same pose, as is the case in protracted runs of conversation, a given background/headset combination can be used on an unlimited number of frames through copying and pasting it onto the stage or through inheritance, described above.

When the author scripts a piece of dialog for an on-screen character, the system automatically knows the character that the character must appear on screen, that speaking animation must be provided for the statement and, optionally, that non-speaking animation must be provided for the character after the statement has been made. The author may choose to animate the character statement with either a movie clip or with the animation tools provided by the system. If the user has selected to use the animation tools provided by the system, the system knows that it must prompt the author to provide an audio recording for the statement, prompt the author to indicate where on the background the character is represented (if the author has not done so already), prompt the author to create a headset for that character on that background and, prompt the user to create an animation file using one of the animation methods discussed below.

The first step in speaking animation is creating a headset 104 that will represent the speaking character. There are three ways of doing this, all of them variations on a single theme: create the headset from scratch, import a headset with its background from another project or from elsewhere in the same project, or import a freestanding headset and paste it onto the background of the frame. Once a headset has been associated with a character and placed on a frame, this headset will appear in any frames in which this background is associated and will be included in all listings of information pertaining to the character with which it is associated.

Figure 8:
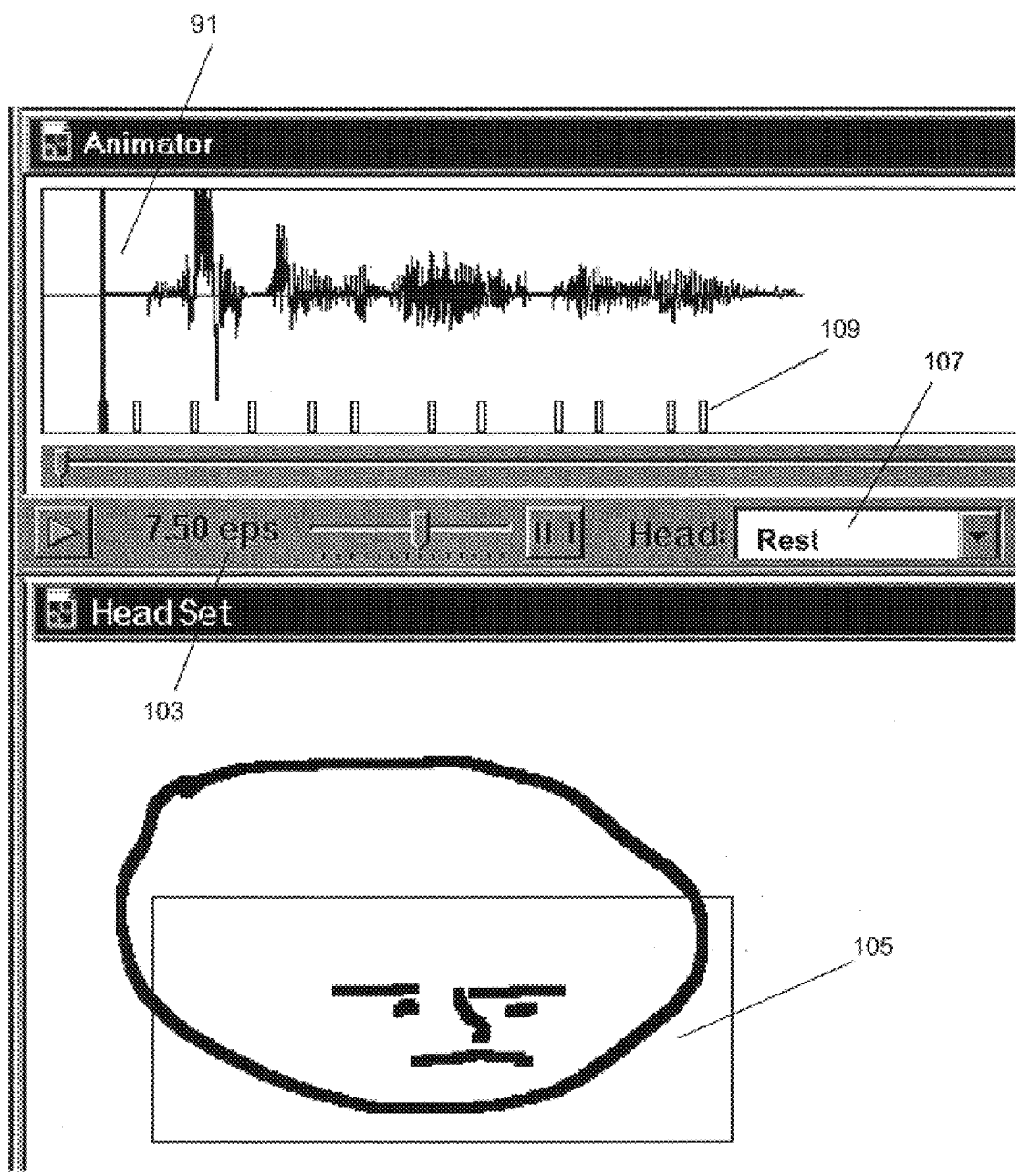
FIG. 8 is a representation of a computer screen viewed by an author in the animation mode of the apparatus of the present invention.
Figure 9:
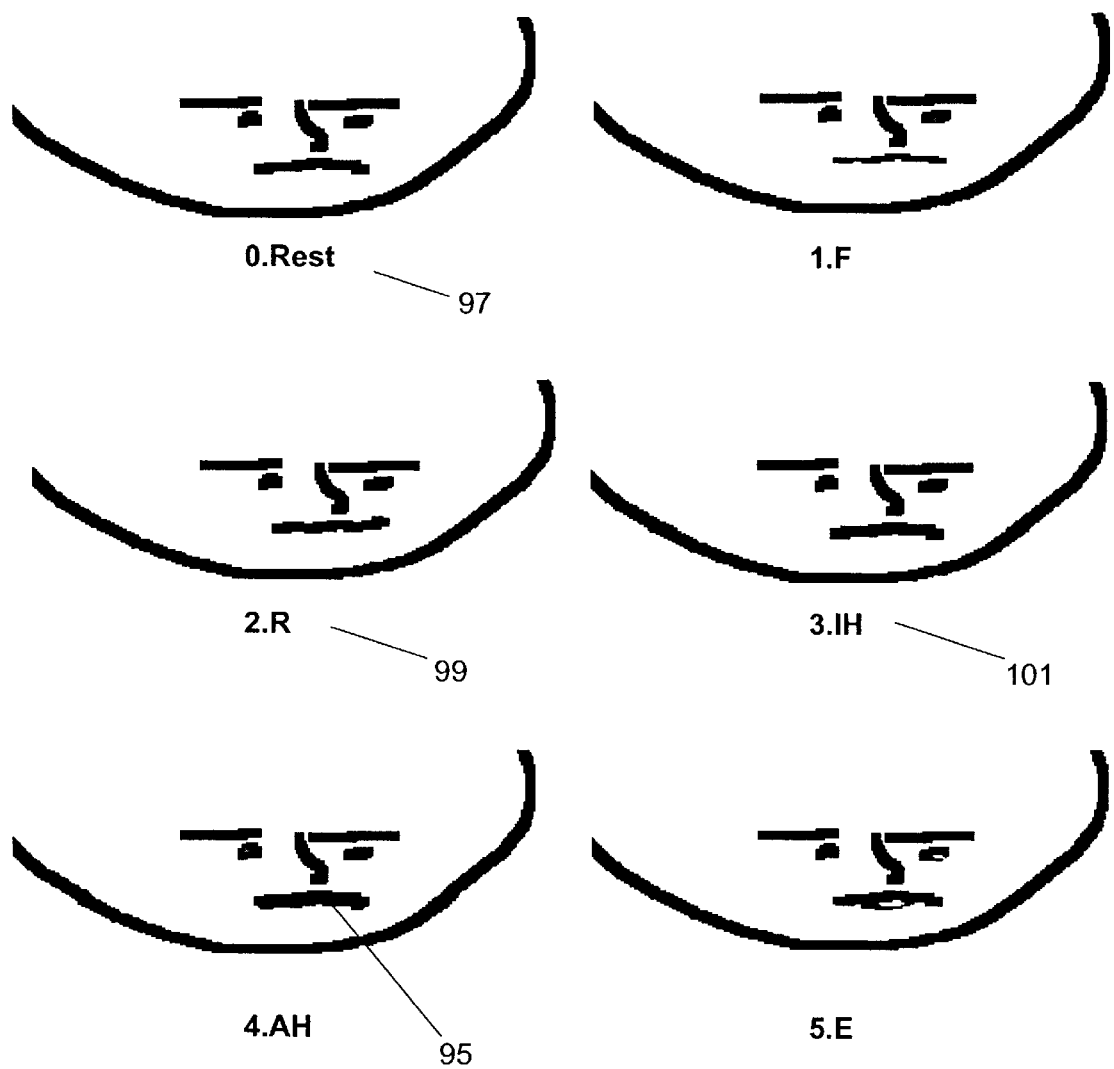
FIG. 9 is a representation of elements of a headset as created by the apparatus of the present invention.

Referring now to FIGS. 8 & 9, the process of creating a headset from scratch is described. To create a headset from scratch, the apparatus provides the author with a rectangle 105 stage, while in the animation mode. The author positions the rectangle 105 around the region to be animated and selects it, thereby causing the apparatus to create a headset file. The headset file, as partially shown in FIG. 9, contains a number of identical copies of the region that the author placed the rectangle around, which is the region that will be animated. This apparatus associates the headset file with both the character whom the headset will represent and with the background that it has been derived from by the process just described. That means that the author can use the headset elsewhere in the project or in another project simply by copying the background, which copies the headset associated with it, and pasting it into another frame. The author can also import a freestanding headset, which is similar to an ordinary headset, but is one in which the background around the character is clear. Since the background is clear, the author can paste the headset onto the background and position it wherever she wants. She can then put a preexisting character into a background that she has created, avoiding the task of creating a new headset.

A given background can have more than one headset associated with it, though each frame may have only one speaking character associated with it. However, if the same background graphic is used on two frames, and there are different onscreen speaking characters on the frames, the author can create a headset for each character. In this manner the author can present two or more onscreen characters talking with each other or with the player, by alternating the statements by each character frame to frame—multiparty conversations. The number of animated characters on a given background is essentially unlimited.

In the process of creating the headset file, the author makes a fundamental choice of the method that she wants to use to do the animation, choosing between the standard animation method 106 and a custom method 108. In the standard method 106 the headset consists of two sets of elements: eight speaking elements and from one to eight listening elements, at the author's option. In the standard method the speaking elements—the elements that will be presented to show the character speaking—have a predetermined value. The first element is the "rest" element, which is identical to the original background graphic. Element two represents the face as it mouths the sound of the letter "v" or "f." Element three represents "b,""p," and "m." Element four represents "eh," "ih," and "ee." Element five represents "ah,""uh," and "oh." Element six represents "d,""g,""h,""j,""k," and "th." Element seven represents "l,""s,""r,""t," and "z." Element eight represents "oo," and "w." It is up to the author, or to her artist, to modify the appearance of each element to give it the shape of the face as it voices each set of sounds. No element can perfectly represent the shape of the face as it mouths all of the elements listed with it; but that is not required. All that is needed is a facial expression that gets close to the common look of the sounds in the element. The listening elements of the headset are those which will be shown on screen after the character has finished speaking. They are as important to the effect of the project on the player as the speaking animation for they convey to the player that the character on screen is "alive," that it is waiting for the player's action, perhaps a little impatient, disgusted, bemused with the player. The most basic of these expressions is simply the blink, which the apparatus presents as a rest element with its eyes closed, keeping it on screen for part of a second. The other listening elements, which might have the character looking left or right, nodding, twitching, sleeping, whatever, are left on screen until replaced by the next element in the animation code. The author has complete control over the timing of the animation elements on screen.

Figure 10:
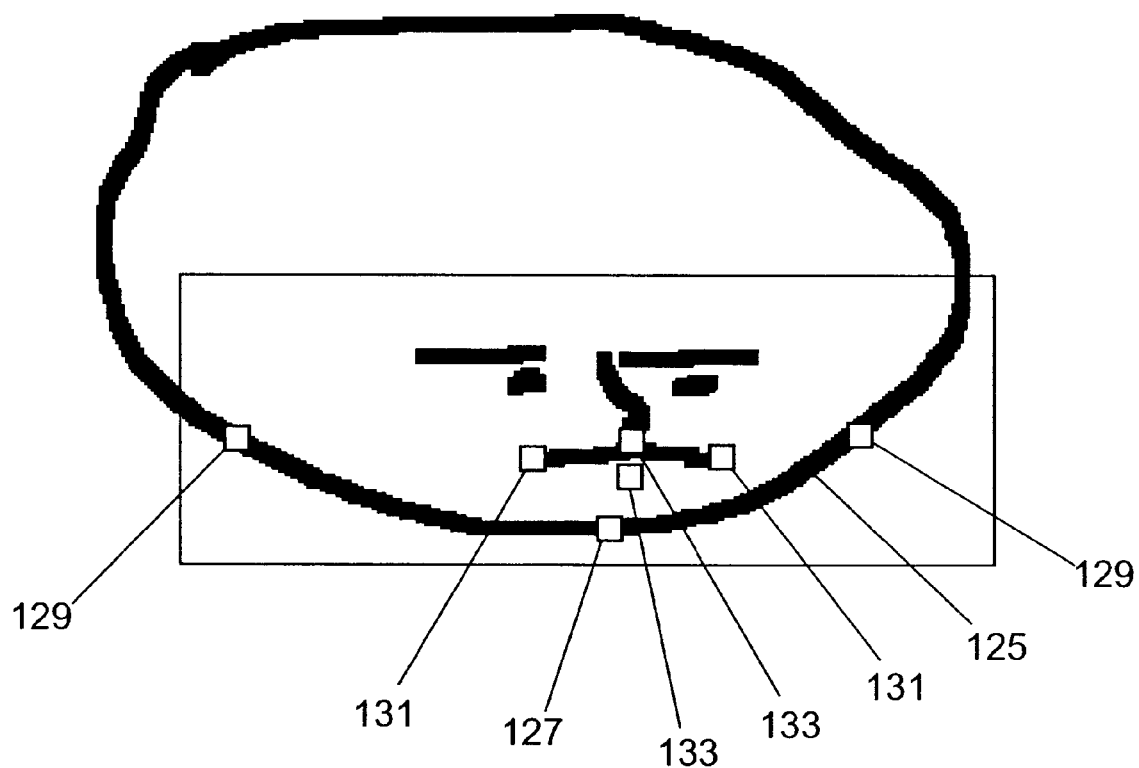
FIG. 10 is a representation of a character to be animated using the automatic headset creation feature of the apparatus of the present invention.

If the author has opted for the standard animation method, she can choose to have the apparatus automatically modify the speaking elements of the headset 110. Referring now to FIG. 10, to have the apparatus to create the headset automatically, the author places a set of markers 125 at fixed points on the graphic of the face to be animated. To use this method, the face must be looking directly out from the computer screen at the player, or nearly so. The author places a marker 125 at the tip of the jaw 127, the hinge points of the jaw 129, the corners of the mouth 131, and the top and bottom edges of the lips 133. The apparatus then transforms each element of the headset into its corresponding expression, using the designated points on the graphic to orient its transformation. Though this automatic creation process has been described in connection with graphics, it should be understood that this process will work equally well with photographs, providing one method of creating virtual video.

The headset thus created by the apparatus will give the author very rapid feedback on the running appearance of the project and may satisfy her needs. However, the author may also use the manual method of editing a headset 112 to modify the automatically created headset or to build a headset from scratch. Referring again to FIG. 9, in the manual method, the author modifies each element of the headset using the graphics tools provided by the apparatus. This process involves the graphical manipulation of at least the mouth 95 of the character to correspond to the shape of a person's mouth while at rest 97 or while voicing the corresponding letters 99 or groups of letters 101. In the alternative, the author may use the launch feature of the apparatus to open the headset file in an application that the author has designated to open files of that type.

Launch and recover make this invention the central piece in the author's multimedia workstation. She uses this invention to generate the story, the graphics and audio media necessary to tell the story, then launches the pieces of media into applications designed to finish them and recovers them back into the apparatus to be organized, integrated, and presented as a finished project. Each of the media files is an independent file which can be duplicated and shared with others in the project development team, secure in the knowledge that when they are returned this apparatus will reintegrate the latest version of each file without any need for the author to manage the files in any way.

The author can avoid the strictures of the standard animation scheme by opting for custom animation 108, in which she chooses the number and composition of the elements in the headset. The author may, for example, choose the simplest animation scheme—one element in addition to the rest element—which minimizes the amount of work needed to edit the headset but results in the most unrealistic animation. At the other extreme, the author may choose thirty-six elements in the speaking headset, so that every phoneme in the language can be represented by a different face. Or the author could opt for a large number of listening elements, so that the character could be shown to be smoothly moving around. In the custom method, the apparatus generates a headset with the number of elements the author has chosen.

In addition to the methods discussed above, the author may also use a method that is based upon individual pictures derived from a video clip 114. In this method, the author takes a short video clip of the actor who portrays the onscreen character, in which the actor voices all of the phonemes in the language, saying something like the standard, "The quick brown fox jumps over the lazy willowy dog." and taking care to have the actor keep his head still while speaking. One frame of the video clip will provide the rest face that is present on the background. The other frames of the video clip provide the raw material, the speaking expressions, that will modify each element of the headset. Still in the animation mode of this apparatus, the author opens the video clip and plays, scrubs or steps through the video clip, looking for the expression that best captures each element. When she finds a frame that effectively expresses one of the elements, the author selects the region of the frame that should be applied to the headset and selects the element of the headset that should be modified. The apparatus then overwrites the designated portion of the headset element with the material from the video frame. The author may have to do some touchup of each headset element if the position of the actor's head moved during the clip, so that the region chosen on the frame does not line up exactly with the headset element, or if the lighting changed during the video clip. The result is animation at low cost that closely approximates the look of video, without the expense, inflexibility and memory requirements of video.

With the headset in place, in whichever way it was created, the next step is the generation of the initial animation code 115. The animation code consists of the list of speaking headset elements that will be presented in conjunction with the audio file of the spoken statement, together with the rate at which they are presented. The realism of the speaking animation is a function of the relationship between the presentation of the headsets and the sound of the spoken statement. The first step toward that realism is the initial animation code provided by the apparatus. The way that code is provided is very different in the custom animation method and the standard animation method.

In the custom method 108, the author has designated the number of speaking and listening elements in the headset. The author has also set the rate at which the speaking elements should be presented on screen as the audio file plays, with 4.5 elements presented per second to keep pace with a very slow talker, all the way to 9.5 elements per second for a fast mumbler. Coordinating the rate at which the elements are provided with the speaking rate of the person making the statement is essential to convincing animation. In this apparatus the author can experiment with different speeds by writing animation code at each rate and looking at the result, then choosing the most natural rate. In this manner, an author who knows nothing about cognitive theory, linguistics or animation technology can do an effective job of animation by simply looking at the way the animation runs and altering it until it looks right.

The apparatus generates instructions which present the speaking elements of the custom headset randomly at the rate set by the author, varying the duration of each element on screen randomly by a duration ranging from a factor of 4 to 9, so that the procession of faces is not regular. The rest head is not presented in the speaking code, unless there is just one other speaking element in the headset, in which case the animation code alternates between the rest element and the other element. An element is never followed by itself, so each element stays on screen for only its 4 to 9 unit duration.

Referring again to FIG. 8, the animation code 109 is represented by a series of small rectangles, each one of which stands for an element of the headset, arranged along a graphical version of the audio clip that is being animated. The audio clip is represented by its amplitude envelope 91, which gives the author a sense of where, in space, the sounds that she is listening to are located. If in the middle of a sound clip, for example, there is silence where the actor recording it paused, that will be represented in the audio envelope as a line without thickness. A loud sound, by contrast, will created a "hill" in the graphic. By listening to the sound and watching its graphical representation and the animation, the author can get a clear sense of which elements in the animation code need to be altered. During audio silence, for example, there should be no animation elements other than the rest face. The author can cut elements from the code, add new elements, change elements and move them along the audio line to change their timing. During editing, the author will again set the pace 103 at which the animation will progress and will choose the various headset elements 107 to represent the various elements of the animation code 109.

The code for listening animation is similar. The apparatus prepares an initial listening code, which the author changes in a similar manner. The listening code, however, presents elements only every few seconds, at a rate that is set by the author. If the author has included no listening elements in the headset, or has included them but has not modified them, the listening code has no effect and can be ignored.

In the standard animation method, the process is generally the same as in the custom method, but with an important difference. Because the speaking elements of the headset are known to the apparatus in the standard method because they conform to the elements set out above and in FIG. 7, it is possible for the apparatus to do an initial job of matching them to the spoken statement. To do this, the apparatus parses 114 the text version of the character statement into its phonemes, which gives it a brute force order of elements present in the statement, though there will be far too many elements in the brute force set to present on screen. It then multiplies the number of seconds in the audio recording of the statement by the number of events per second set by the author, which gives the total number of events in the animation code. Finally, it prunes the brute force element list to the total number of events desired, applying the rule that the same element may not follow itself. The author can accept this computer generated animation code or reject the code thus created and have the apparatus create an initial animation code under the random method 116. Once the system has given the author a satisfactory place to start, the author is ready to edit the animation code by hand 118.

Providing non-speaking animation is similar to speaking animation, but simpler. The "animation set" is created in the same way, with the author defining the animation region 120 by placing a box around the portion of the background that is to be animated. The author specifys the number of elements to the animation set, then edits the animation set 124 in a bitmap editor. The animation will play as soon as the frame that it is on is triggered, and it will continue playing until the condition stipulated by the author for its cessation has been triggered. The author may set the rate at which the animation is to play and may condition cessation 122 on any number of playthroughs of the elements, upon an event such as the player's mouse click, or upon a time. In addition, the author may associate an audio clip with the animation, so, for example, the author could have a telephone begin to ring and jump around, stopping when the player clicked his mouse on it.

Figure 11:
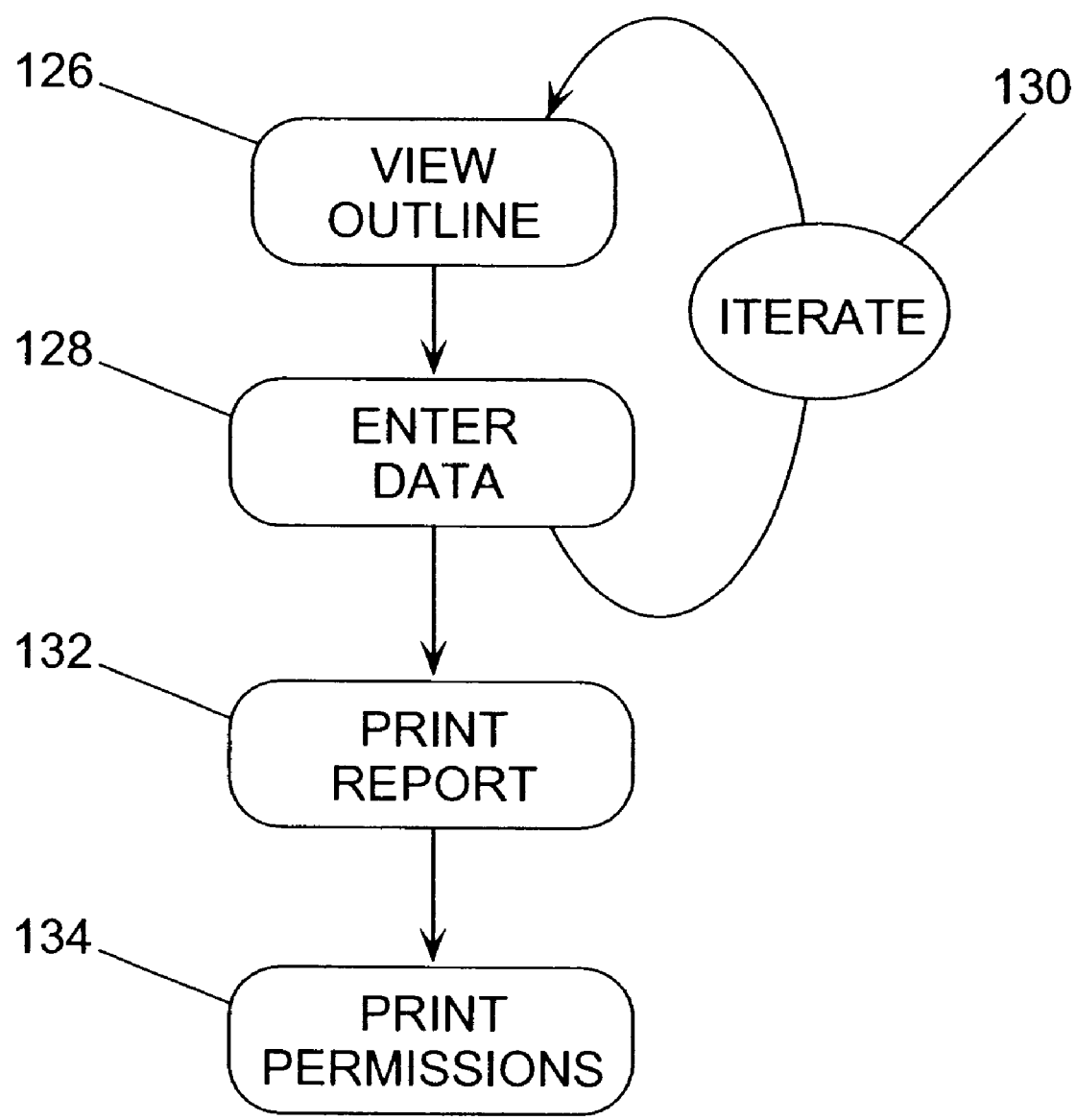
FIG. 11 is a flow chart of the method of providing ownership information in accordance with the present invention.

Referring now to FIG. 11, a flowchart describing the provision of ownership information is presented. A multimedia project will contain hundreds, more likely thousands, of separately ownable chunks of property. Every block of text, character, audio recording, background, video clip, headset and animation set is a discretely ownable piece of property. Where the author has created every one of those elements herself or where the project will not be placed for sale, there may be little reason to keep track of who owns each piece of property in the project. But where the project may be sold and where there are a number of creators of the various chunks of property in the project keeping track of their ownership is essential.

The trouble is, of course, that tracking the ownership of dozens of things, let alone hundreds or thousands of them, is a tedious job. This invention vastly simplifies that task by providing a mode of operation in which the author may record ownership information. In this mode the outline lists every ownable element 126 in the entire project, with a "loose end" constituting an element which lacks some minimum amount of ownership information. Entry of the ownership information 128 is done through a properties dialog box, which presents the author with two methods of information entry. In the first method, the sophisticated author who has an operating knowledge of the rules of copyright law can directly enter information on the ownership of the piece and can identify the basis for her claim to have a right to use the property in the project (e.g., she is the one who created it; the one who created it was her employee; the one who created it gave her a license; she does not have any right to use it; and so on). If this information is filled in the item is no longer loose. If the author has indicated that she does not have a right to use the property, or if there is some question on the matter, the item is not loose, but the outline does indicate that the item is not included by right.

If the author is not clear about what constitutes ownership in the chunk of property she may engage in the second method of data entry, an interactive dialog. The copyright laws operate differently on each of the different types of property in a multimedia project. In a video clip, for example, there may be any number of owners, from the composer of the background music, to the creator of any graphics displayed in it, to the actors, to the director, to the screenwriter. The interactive function guides the author through an analysis of each of each type of property in a way that identifies the different requirements of each. Under either method the author may make the information provided for one piece of media apply to an entire category of the media, so that duplication of effort is avoided. The author may get all of the information in the ownership database in printout form 132. The apparatus will also produce requests for permission 134 to use a property in either paper or email form to automate the permission process. The printout of the database and the permission applications the author's evidence of a good faith effort to comply with the requirements of the law, evidence that the author has attempted to respect the property rights of the owners of the media.

Figure 12:
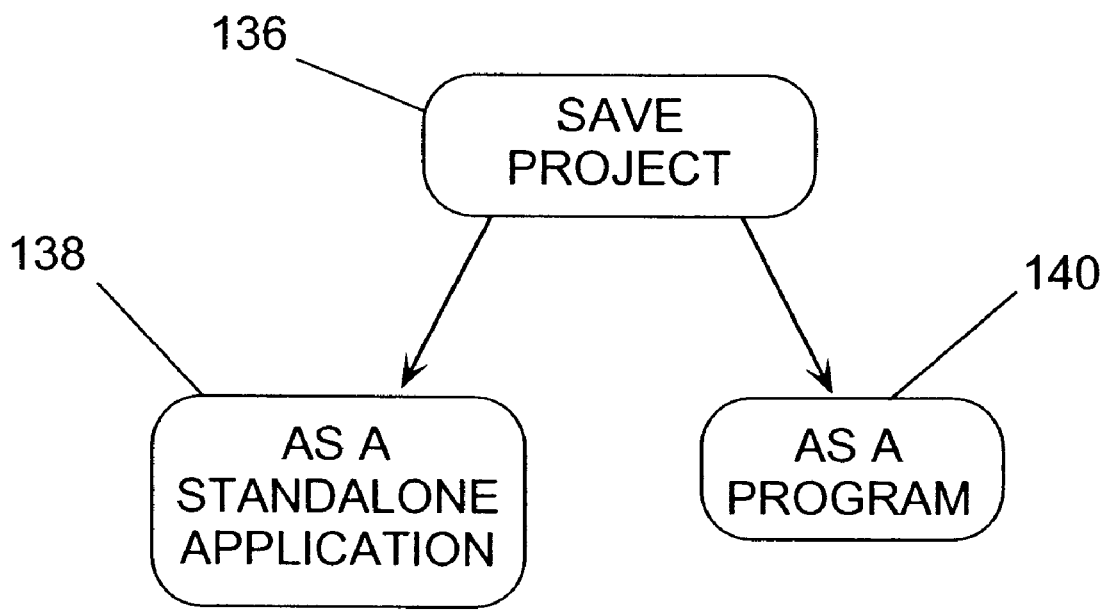
FIG. 12 is a flow chart of the method of producing a project in accordance with the present invention.

Referring now to FIG. 12, the project production options are shown. This invention will produce two types of output. The first is a finished standalone project that can be delivered as a running program 138, together with the supporting files necessary to install and run the program on another computer or network. The author may also save a version of the project in one of a number of different programming languages 140. In this way the project provided under the foregoing process can act as the foundation of further develop under other systems.

Although the present invention has been described in considerable detail with reference to certain preferred versions thereof, other versions will be readily apparent to those of ordinary skill in the art. Therefore, the spirit and scope of the appended claims should not be limited to the description of the preferred versions contained herein.

What is claimed is:

1. An apparatus for creating an interactive multimedia presentation comprising:

a processor having a monitor and data storage means attached thereto; and a multimedia database stored in said data storage means and comprising at least one data object chosen from a group consisting of audio data, video data, textual data and graphical data;

wherein said processor comprises means, coupled to the multimedia database, for creating and linking frames, scenes and action items, wherein said means for creating and linking frames, scenes and action items automatically records said action items, and links from said action items, in an outline of the interactive multimedia presentation as an author creates said action items and informs said author when a link has not been created from a given action item to another frame; and wherein said processor further comprises means for keeping track of audio data objects associated with a character, and means for generating a shoot list of unrecorded audio data objects associated with said character.

2. The apparatus as claimed in claim 1 wherein said processor further comprises means for keeping track of video data objects associated with a character and means for generating a shoot list of unrecorded video data objects associated with said character.

3. The apparatus as claimed in claim 1 wherein said processor further comprises a means for recording an author audio data object, playing said author audio data object, recording a performer audio data object and comparing said author audio data object with said performer audio data object.

4. The apparatus as claimed in claim 1 wherein said processor further comprises a comprompter.

5. The apparatus as claimed in claim 1 wherein said processor further comprises a means for animating graphical objects.

6. In a computer system, a method of creating a multimedia presentation comprising the steps of:

writing a script comprising a series of scenes, frames and action items, said step of writing a script comprising the steps of;
creating a scene;
creating a series of frames within said scene;
writing dialog within said frames said dialog corresponding to at least two distinct characters;
providing a background for said frames;
creating an action item to link each of said frames to another of said frames;
recording audio data objects corresponding to dialog in said frames;
keeping track of unrecorded audio data objects associated with each of said characters; and
generating a shoot list of said unrecorded audio data objects associated with each of said characters.

7. The method as claimed in claim 6, wherein the step of recording audio data objects comprises the steps of;

a) recording an initial audio data object by an author;
b) playing said audio data object to a performer;
c) recording a new audio data object by said performer;
d) comparing said initial audio data object and said new audio data object; and
e) repeating steps b, c and d until a satisfactory audio data object has been recorded.

8. The method as claimed in claim 6 further comprising the step of recording video data objects corresponding to dialog in said frames.

9. The method as claimed in claim 8, wherein the step of recording video data objects comprises the steps of;

a) recording an initial audio data object by an author;
b) playing said audio data object to a performer;
c) displaying text corresponding to said audio data object on a screen of a computer;
d) recording a video data object by said performer;
e) comparing said initial audio data object and said video data object; and
f) repeating steps b, c, d and e until a satisfactory video data object has been recorded.

10. The method as claimed in claim 6 further comprising the step of animating said characters such that movements of said characters are coordinated with a playback of said recorded audio data objects.

11. An apparatus for creating an interactive multimedia presentation comprising:

a processor having a monitor and data storage means attached thereto; and a multimedia database stored in said data storage means and comprising at least one data object chosen from a group consisting of audio data, video data, textual data and graphical data;

wherein said processor comprises means, coupled to the multimedia database, for creating and linking frames, scenes and action items, wherein said means for creating and linking frames, scenes and action items automatically records said action items, and links from said action items, in an outline of the interactive multimedia presentation as an author creates said action items and informs said author when a link has not been created from a given action item to another frame; and wherein said processor further comprises a means for recording an author audio data object, playing said author audio data object, recording a performer audio data object, and comparing said author audio data object with said performer audio data object.

12. The apparatus as claimed in claim 11 wherein said procssor further comprises a comprompter.

13. The apparatus as claimed in claim 11 wherein said processor further comprises a means for animating graphical objects.

14. The apparatus as claimed in claim 11 wherein said processor further comprises means for keeping track of video data objects associated with a character and means for generating a shoot list of unrecorded video data objects associated with said character.

* * * * *